(12) United States Patent
Zhang et al.

(10) Patent No.: US 12,467,548 B2
(45) Date of Patent: Nov. 11, 2025

(54) THREADED FIXING STRUCTURE

(71) Applicant: HAMATON AUTOMOTIVE TECHNOLOGY CO., LTD., Hangzhou (CN)

(72) Inventors: Jianer Zhang, Hangzhou (CN); Shuqin Jiang, Hangzhou (CN)

(73) Assignee: HAMATON AUTOMOTIVE TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/725,633

(22) PCT Filed: May 23, 2022

(86) PCT No.: PCT/CN2022/094386
§ 371 (c)(1),
(2) Date: Jun. 28, 2024

(87) PCT Pub. No.: WO2023/123831
PCT Pub. Date: Jul. 6, 2023

(65) Prior Publication Data
US 2024/0418278 A1    Dec. 19, 2024

(30) Foreign Application Priority Data

Dec. 30, 2021 (CN) .......................... 202111652579.6
Dec. 30, 2021 (CN) .......................... 202123453433.7

(51) Int. Cl.
*F16K 15/20* (2006.01)
*B60C 23/04* (2006.01)
*G01L 17/00* (2006.01)

(52) U.S. Cl.
CPC .......... *F16K 15/20* (2013.01); *B60C 23/0496* (2013.01); *G01L 17/00* (2013.01); *Y10T 403/4991* (2015.01)

(58) Field of Classification Search
CPC .............. B60C 23/0496; B60C 29/005; Y10T 137/3662; Y10T 403/4991; Y10T 403/4974; Y10T 403/4916
(Continued)

(56) References Cited

U.S. PATENT DOCUMENTS 470,514 A * 3/1892 Simpson ................ F16L 13/146
16/108
1,403,797 A * 1/1922 Mccormick ......... B60C 23/0496
137/227
(Continued)

FOREIGN PATENT DOCUMENTS

CN        204109700 U      1/2015
CN        205836396 U     12/2016
(Continued)

*Primary Examiner* — Robert K Arundale
(74) *Attorney, Agent, or Firm* — MUNCY, GEISSLER, OLDS & LOWE, P.C.

(57) ABSTRACT

A threaded fixing structure includes an inflating valve, a base and a sealing ring, the inflating valve is in threaded connection with the base, the sealing ring is arranged between the inflating valve and the base, after the threaded connection between the inflating valve and the base is completed, a fixed protrusion portion is formed on the surface, attached to the inflating valve, of the base by punching, and the fixed protrusion portion is sunken into the inflating valve to limit the relative rotation between the base and the inflating valve. Accordingly, the inflating valve and the base are limited and locked with each other through a fixing part, so that the relative rotation between the inflating valve and the base is avoided, the threaded connection between the inflating valve and the base is prevented from loosening.

6 Claims, 5 Drawing Sheets

(58) Field of Classification Search
USPC .......................................................... 29/525
See application file for complete search history.

(56) References Cited

U.S. PATENT DOCUMENTS

| | | | | |
|---|---|---|---|---|
| 1,648,332 A * | 11/1927 | Welton | ................ | B60C 23/0496 152/429 |
| 1,911,775 A * | 5/1933 | Smith | .................... | B21D 39/04 425/DIG. 26 |
| 2,563,968 A * | 8/1951 | Simmons | ................ | B60S 5/043 137/227 |
| 3,380,427 A * | 4/1968 | Rubin | ................. | B60C 23/0496 116/DIG. 8 |
| 3,555,831 A * | 1/1971 | Pogonowski | ........... | E02B 17/00 29/523 |
| 3,999,430 A * | 12/1976 | Parduhn | ................. | G01L 17/00 73/756 |
| 4,763,516 A * | 8/1988 | Greenspan | .............. | G01L 17/00 73/756 |
| 7,458,256 B1 * | 12/2008 | Lin | .................... | B60C 23/0408 152/417 |
| 2004/0168297 A1 * | 9/2004 | Nishimura | ........... | B21D 39/031 29/521 |
| 2008/0149244 A1 * | 6/2008 | Liao | .................... | B60C 23/0408 152/427 |
| 2009/0028662 A1 * | 1/2009 | Babej | .................... | F16B 37/068 29/525 |
| 2009/0152898 A1 * | 6/2009 | Kawamura | ........... | F16L 13/147 403/285 |
| 2012/0152009 A1 * | 6/2012 | Huang | ................ | B60C 23/0496 73/146.8 |
| 2015/0217606 A1 * | 8/2015 | Peng | .................... | B60C 23/0496 73/146.8 |
| 2019/0001763 A1 * | 1/2019 | Jordan | ................ | B60C 29/002 |
| 2022/0234402 A1 * | 7/2022 | Zhang | ................... | F16K 27/0209 |

FOREIGN PATENT DOCUMENTS

| | | |
|---|---|---|
| CN | 107627793 A | 1/2018 |
| CN | 210344457 U | 4/2020 |
| CN | 210363223 U | 4/2020 |
| CN | 211195731 U | 8/2020 |
| EP | 1942018 A1 | 7/2008 |
| JP | 2016130049 A | 7/2016 |

* cited by examiner

THREADED FIXING STRUCTURE

FIELD OF THE INVENTION

The present invention belongs to the technical field of automotive parts, particularly relates to a threaded fixing structure.

BACKGROUND OF THE INVENTION

An inflating valve of an automobile tire (and a rim) is a standard mounted accessory and has functions of inflating (or filling liquid), deflating and sealing the tire. An external inflating valve is loaded on the inflating valve of the original tire and is used for carrying a barometer, a tire pressure and temperature monitoring sensor, an automatic tire air supply device, an inflating extension pipe and the like so as to increase the functions of facilitating inflation and deflation, keeping the tire pressure, monitoring the tire pressure and temperature, etc. A tire pressure meter (shown in FIG. 1) for measuring the tire pressure, a sensor (shown in FIG. 2) for monitoring the tire pressure on the inflating valve of the automobile and the like are loaded on the inflating valve of the automobile. Connection modes include conventional welding mode, threaded connection, etc. The middle of two parts in threaded connection can be sealed by a sealant or a sealing ring to prevent the two parts from loosening and separating. The conventional method comprises the following steps: 1, coating thread glue in the middle of threads for fixing: and 2, coating metal glue on the planes of the two parts for fixing. If the connection mode is the welding mode, the processing technology is complex, the parameter requirement is high, the defect detection is difficult, and the reliability is low; and if the connection mode is the threaded connection, and glue is used for preventing loosing, the glue easily fails in a certain environment, and consequently, the sealing property of the product is difficult to ensure.

SUMMARY OF THE INVENTION

An object of the present invention is to solve the above technical problems in the prior art and provide a threaded fixing structure that can improve the connecting effect between a base and an inflating valve and avoid the looseness between the base and the inflating valve.

A threaded fixing structure comprises an inflating valve, a base and a sealing ring: the inflating valve is in threaded connection with the base: the sealing ring is arranged between the inflating valve and the base: after the threaded connection between the inflating valve and the base is completed, a fixed protrusion portion is formed on the surface, attached to the inflating valve, of the base by punching: and the fixed protrusion portion is sunken into the inflating valve to limit the relative rotation between the base and the inflating valve. The inflating valve and the base are limited and locked with each other through the fixed protrusion portion, so that the relative rotation between the inflating valve and the base is avoided, the threaded connection between the inflating valve and the base is prevented from loosening, and as a result, the connecting effect of the base and the inflating valve is improved. Punching is performed from the upper part of the base, so that the punching is more convenient, the punching efficiency is improved, and the cost is reduced. When the base is punched, the base deforms to form the fixed protrusion portion, and the fixed protrusion portion is sunken into the inflating valve to form a fixing groove in the inflating valve.

Further, the inflating valve is provided with a sealing groove, and the sealing ring is arranged in the sealing groove. Through the arrangement of the sealing groove, the sealing ring can be conveniently fixed and prevented: and meanwhile, the attaching degree of the sealing ring, the inflating valve and the base can be guaranteed, and the sealing effect is improved.

Further, the base is provided with a connecting column: the connecting column is provided with outer threads: the inflating valve is provided with a connecting hole: the connecting hole is provided with inner threads: and the connecting column is in threaded connection with the connecting hole. Through the arrangement of the connecting column and the connecting hole, the base and the inflating valve are conveniently connected.

Further, the inflating valve is provided with a first connecting face, the base is provided with a second connecting face, and the first connecting face and the second connecting face are attached. Through the arrangement of the first connecting face and the second connecting face, the inflating valve and the base are in tight contact without a gap, so that the connecting sealing effect of the inflating valve and the base can be guaranteed, and leakage is avoided.

Further, the connecting column is provided with a vent hole to achieve the communication between the inflating valve and the base. Through the arrangement of the vent hole. communication between the inflating valve and the base can be achieved, and a sensor on the base can conveniently monitor the air pressure on the inflating valve.

Further, the base is provided with an annular protrusion portion, and an accommodating groove is formed by the annular protrusion portion and the base. Through the arrangement of the accommodating groove, the sensor can be conveniently positioned and fixed to the base, and the mounting of the sensor is facilitated.

Further, the fixing part is a fixing pin, the inflating valve is provided with a first fixing hole, the base is provided with a second fixing hole, the position of the first fixing hole is corresponding to the position of the second fixing hole, and the fixing pin passes through the second fixing hole and is arranged on the first fixing hole. The fixing part is in the form of a fixing pin, which enables the base and the inflating valve to lock each other, prevent the relative rotation and exerts an anti-loosening effect.

With the foregoing technical solutions, the present invention can achieve the following beneficial effects.

When in use, the sealing ring is placed in the sealing groove, and then the connecting column is aligned with the connecting hole and screwed in: after screwing, punching is carried out on the bottom of the base, thus the bottom face of the base protrudes to form the fixed protrusion portion: the a connecting plane is sunken to form the fixing groove, and therefore the base and the inflating valve are interlocked, and as a result, the looseness between the base and the inflating valve is avoided. With the adoption of the present invention, the connecting effect between the base and the inflating valve can be improved, and the looseness between the base and the inflating valve is avoided.

BRIEF DESCRIPTION OF THE DRAWINGS

The present invention will be further described below in conjunction with accompanying drawings.

Figure 1:
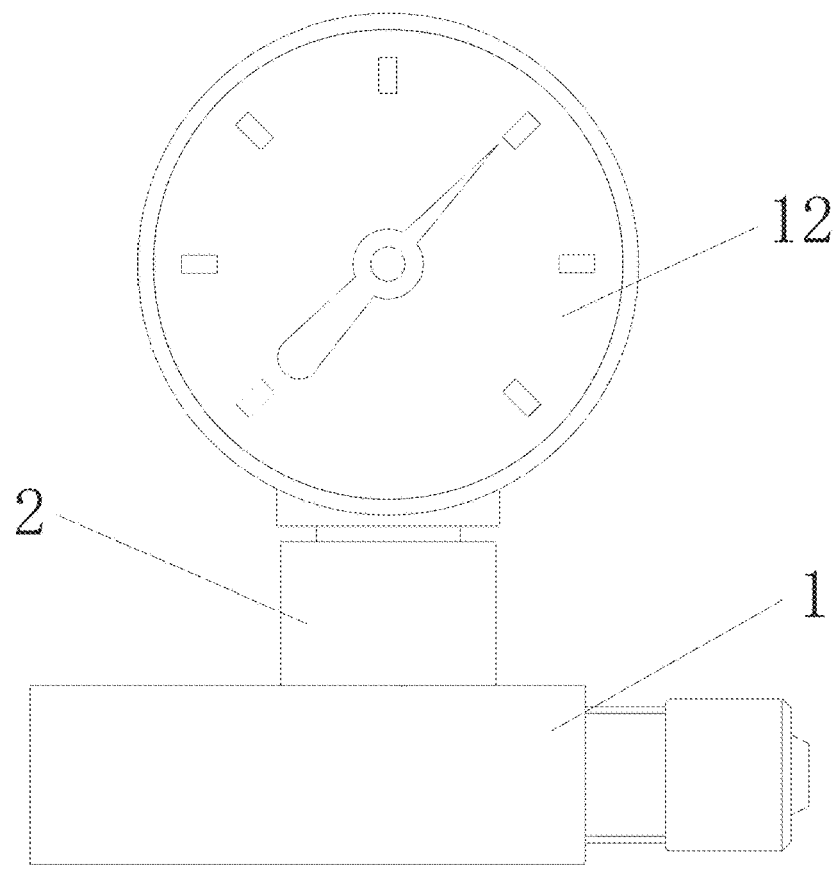
FIG. 1 is a schematic diagram of a structure connected with a tire pressure meter in the prior art.

Reference numerals: 1—inflating valve: 2—base: 3—sealing ring: 4—fixed protrusion portion: 5—fixing groove: 6—sealing groove: 7—connecting column: 8—connecting hole: 9—vent hole: 10—annular protrusion portion: 11—accommodating groove: 12—tyj: 13—cgq: 14—first connecting face: and 15—second connecting face.

DETAILED DESCRIPTION

Figure 2:
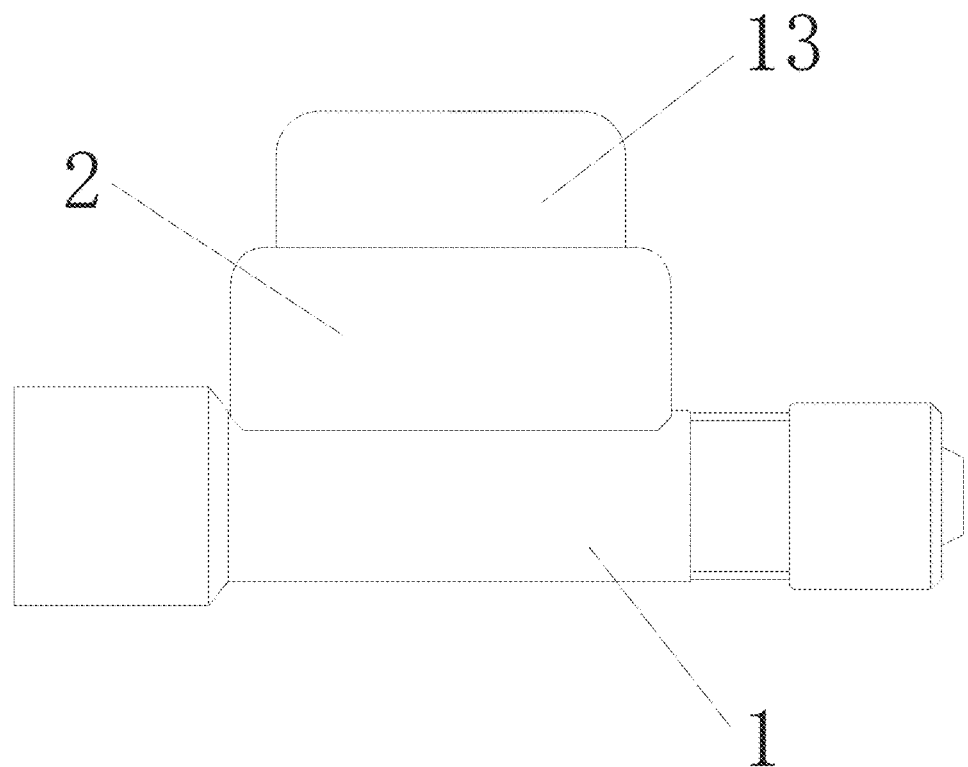
FIG. 2 is a schematic diagram of a structure connected with a sensor in the prior art.
Figure 3:
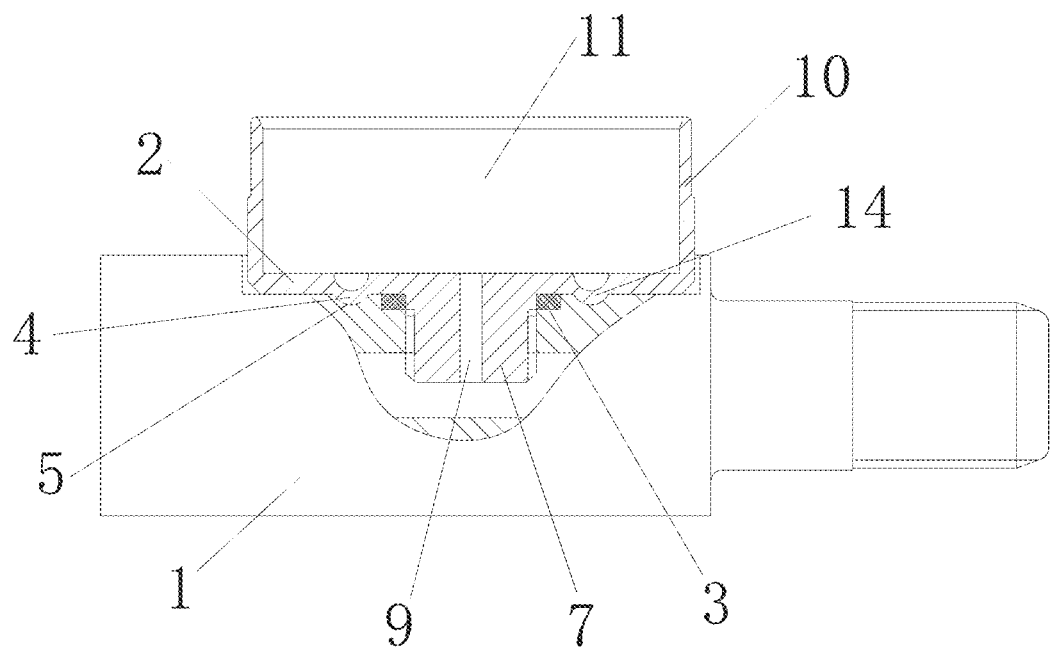
FIG. 3 is a structural representation of a threaded fixing structure of the present invention.
Figure 4:
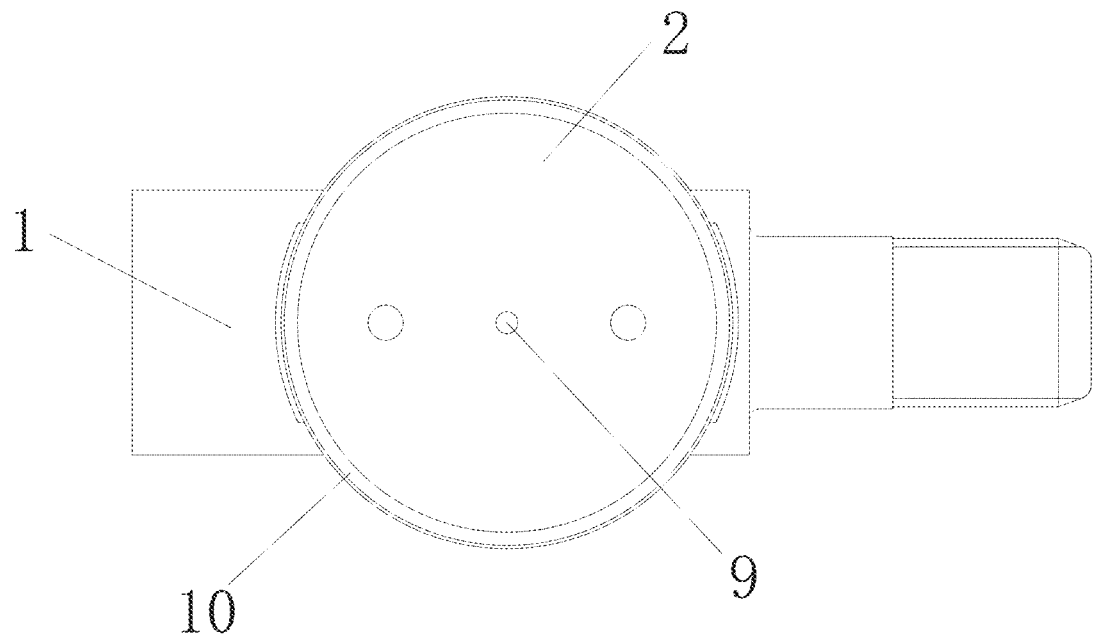
FIG. 4 is a top view of the present invention.
Figure 5:
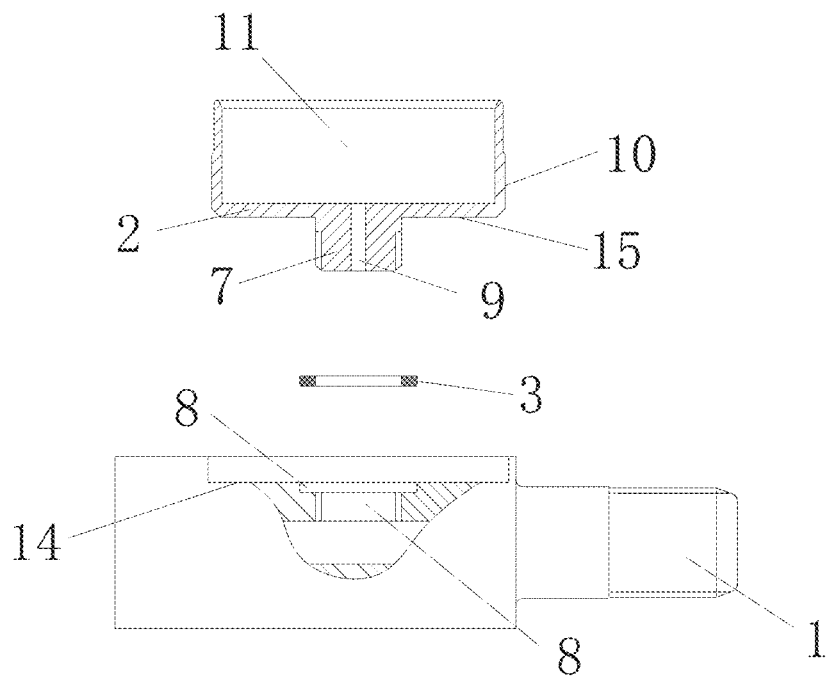
FIG. 5 is an exploded view of the present invention.
Figure 6:
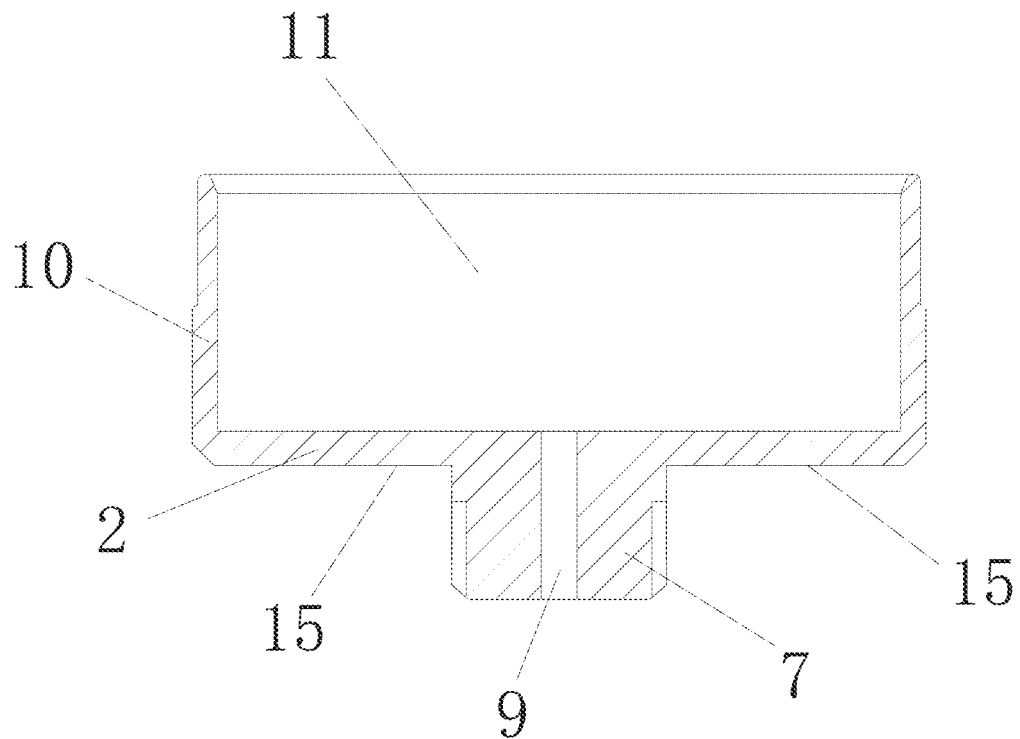
FIG. 6 is a structural representation of a base in the present invention.
Figure 7:
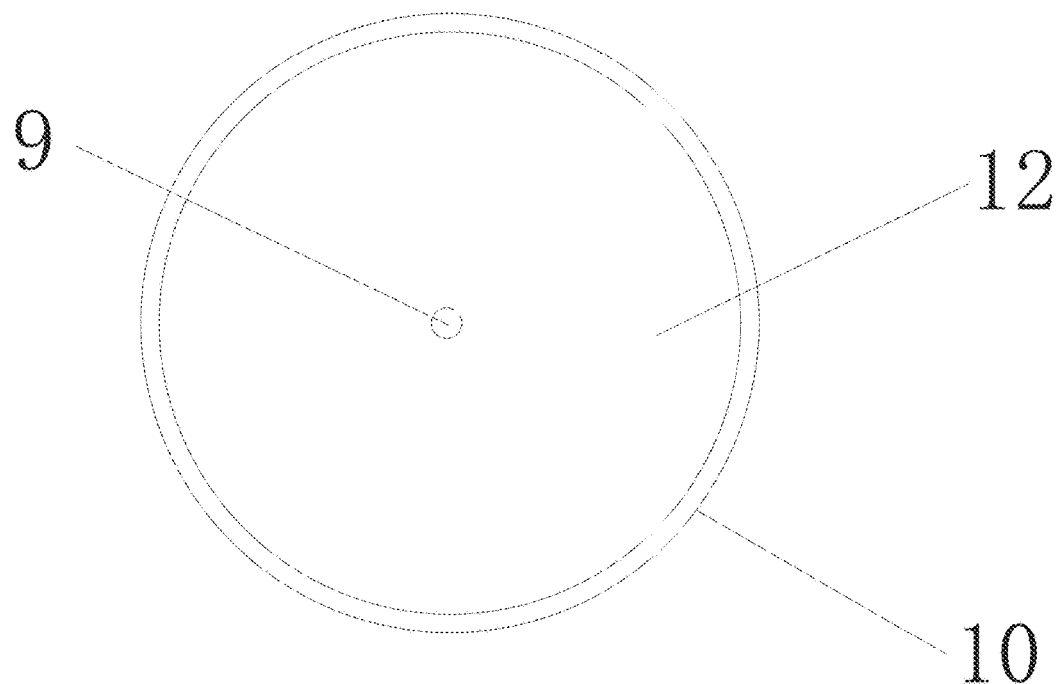
FIG. 7 is a top view of a base in the present invention.
Figure 8:
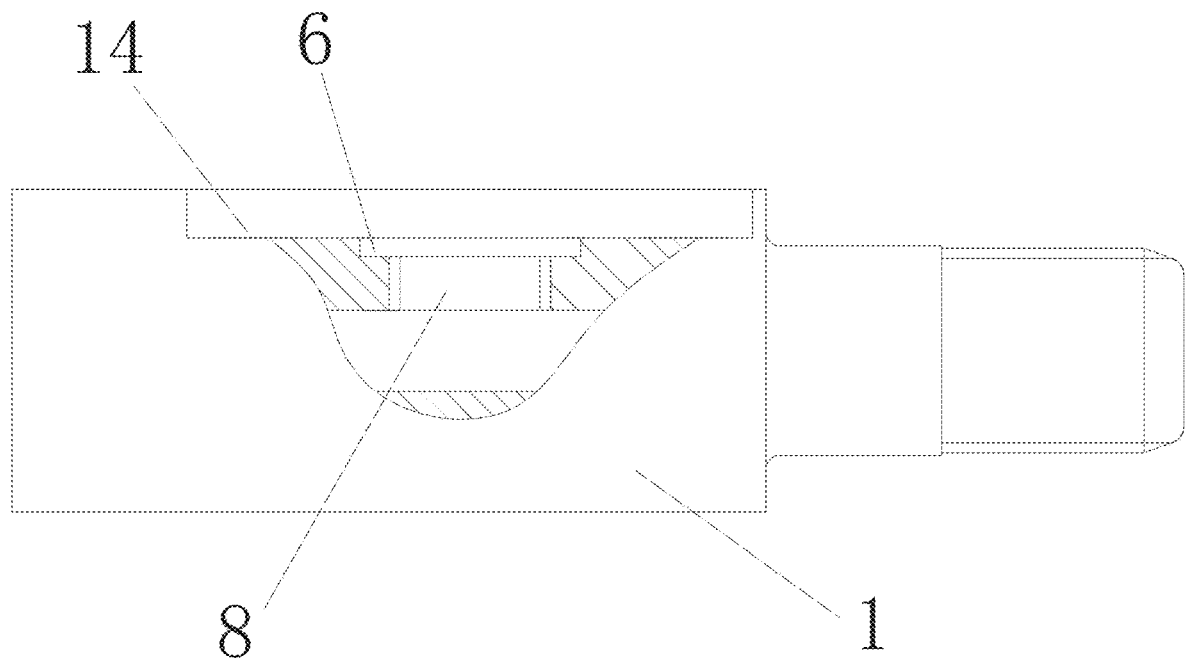
FIG. 8 is a structural representation of an inflating valve in the present invention.
Figure 9:
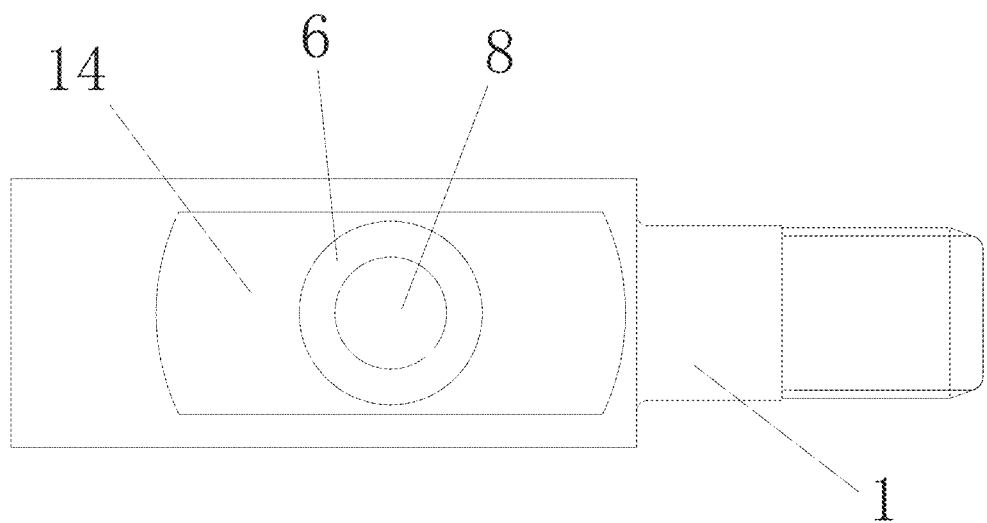
FIG. 9 is a top view of an inflating valve in the present invention.

As shown in FIG. 1 to FIG. 9, a threaded fixing structure is provided. The threaded fixing structure comprises an inflating valve 1, a base 2 and a sealing ring 3: the inflating valve 1 is in threaded connection with the base 2: the sealing ring 3 is arranged between the inflating valve 1 and the base 2: after the threaded connection between the inflating valve 1 and the base 2 is completed, a fixed protrusion portion 4 is formed on the surface, attached to the inflating valve 1, of the base 2 by punching: and the fixed protrusion portion 4 is sunken into the inflating valve 1 to limit the relative rotation between the base 2 and the inflating valve 1. The inflating valve 1 and the base 2 are limited and locked with each other through the fixed protrusion portion 4, so that the relative rotation between the inflating valve 1 and the base 2 is avoided, the threaded connection between the inflating valve 1 and the base 2 is prevented from loosening, and as a result, the connecting effect of the base 2 and the inflating valve 1 is improved. Punching is performed from the upper part of the base 2, so that the punching is more convenient, the punching efficiency is improved, and the cost is reduced. When the base 2 is punched, the base 2 deforms to form the fixed protrusion portion 4, and the fixed protrusion portion 4 is sunken into the inflating valve 1 to form a fixing groove 5 in the inflating valve 1. The thickness of the fixed protrusion portion 4 is 0.2-0.9 times that of the bottom of the base 2.

The inflating valve 1 is provided with a sealing groove 6, and the sealing ring 3 is arranged in the sealing groove 6. Through the arrangement of the sealing groove 6, the sealing ring 3 can be conveniently fixed and prevented: and meanwhile, the attaching degree of the sealing ring 3, the inflating valve 1 and the base 2 can be guaranteed, and the sealing effect is improved. The depth of the sealing groove 6 is 0.6-0.8 times the thickness of the sealing ring 3.

The base 2 is provided with a connecting column 7: the connecting column 7 is provided with outer threads: the inflating valve 1 is provided with a connecting hole 8: the connecting hole 8 is provided with inner threads: and the connecting column 7 is in threaded connection with the connecting hole 8. Through the arrangement of the connecting column 7 and the connecting hole 8, the base 2 and the inflating valve 1 are conveniently connected.

The inflating valve 1 is provided with a first connecting face 14, the base 2 is provided with a second connecting face 15, and the first connecting face 14 and the second connecting face 15 are attached. Through the arrangement of the first connecting face 14 and the second connecting face 15, the inflating valve 1 and the base 2 are in tight contact without a gap, so that the connecting sealing effect of the inflating valve 1 and the base 2 can be guaranteed, and leakage is avoided. The first connecting face 14 and the second connecting face 15 can be planes and can also be spherical faces attached to each other.

The connecting column 7 is provided with a vent hole 9 to achieve the communication between the inflating valve 1 and the base 2. Through the arrangement of the vent hole 9, communication between the inflating valve 1 and the base 2 can be achieved, and a sensor 13 on the base 2 can conveniently monitor the air pressure on the inflating valve 1.

The base 2 is provided with an annular protrusion portion 10, and an accommodating groove 11 is formed by the annular protrusion portion 10 and the base 2. Through the arrangement of the accommodating groove 11, the sensor 13 can be conveniently positioned and fixed to the base 2, and the mounting of the sensor 13 is facilitated.

Through the matching of the fixed protrusion portion 4 and the fixing groove 5 which are formed by one-time punch forming, machining is convenient: and meanwhile, the matching degree of the fixed protrusion portion 4 and the fixing groove 5 is high, so that the interlocking effect is good.

According to the present invention, when the structure is mostly used for connecting through two threads, it needs to be guaranteed that two connecting pieces cannot move or loosen in a vibration process or a high-speed operation process.

Vibration test: the test is carried out on an electric vibration testing machine: a structural piece of the present invention is fixed to a test jig: sinusoidal vibration is carried out for 2 min at a frequency of 8-10 Hz and a displacement amplitude of 15 mm; the process is repeated three times: and then the structural piece is dismounted to be observed whether it is free of loosening and displacement or not.

According to the present invention, when in use, the sealing ring 3 is placed in the sealing groove 6, and then the connecting column 7 is aligned with the connecting hole 8 and screwed in: after screwing, punching is carried out on the bottom of the base 2, thus the bottom face of the base 2 protrudes to form the fixed protrusion portion 4: the a connecting plane is sunken to form the fixing groove 5, and therefore the base 2 and the inflating valve 1 are interlocked, and as a result, the looseness between the base 2 and the inflating valve 1 is avoided. With the adoption of the present invention, the connecting effect between the base 2 and the inflating valve 1 can be improved, and the looseness between the base 2 and the inflating valve 1 is avoided.

The foregoing description merely describes the specific embodiments of the present invention, but the technical features of the present invention are not limited thereto. Any simple changes, equivalent replacements or modifications made on the basis of the present invention to solve basically the same technical problems and achieve basically the same technical effects shall fall within the scope of protection of the present invention.

The invention claimed is:

1. A threaded fixing structure, comprising:
an inflating valve,
a base and
a sealing ring,
wherein the inflating valve is provided with a first connecting face, the base is provided with a second connecting face, the inflating valve is in threaded connection with the base along a rotation axis which are perpendicular to the first connecting face and the second connecting face, the sealing ring is arranged between the inflating valve and the base,
wherein after the threaded connection along the rotation axis between the inflating valve and the base is completed, the first connecting face and the second connecting face are attached, a fixed protrusion portion is formed on the second connecting face perpendicular to the rotation axis by punching, and the fixed protrusion portion is sunken into the inflating valve to form a fixing groove in the first connecting face perpendicular to the rotation axis to limit the relative rotation between the base and the inflating valve.

2. The threaded fixing structure according to claim 1, wherein the inflating valve is provided with a sealing groove, and the sealing ring is arranged in the sealing groove.

3. The threaded fixing structure according to claim 1, wherein the base is provided with a connecting column, the connecting column is provided with outer threads, the inflating valve is provided with a connecting hole, the connecting hole is provided with inner threads, and the connecting column is in threaded connection with the connecting hole.

4. The threaded fixing structure according to claim 1, wherein the connecting column is provided with a vent hole to achieve the communication between the inflating valve and the base.

5. The threaded fixing structure according to claim 1, wherein the punching is performed from the upper part of the base, when the base is punched, the base deforms to form the fixed protrusion portion, and the fixed protrusion portion is sunken into the inflating valve to form a fixing groove in the inflating valve.

6. The threaded fixing structure according to claim 1, wherein the base is provided with an annular protrusion portion, and an accommodating groove is formed by the annular protrusion portion and the base.

* * * * *